US012545036B2

(12) United States Patent
Kosuge et al.

(10) Patent No.: US 12,545,036 B2
(45) Date of Patent: Feb. 10, 2026

(54) MEDIUM TRANSPORT DEVICE AND RECORDING APPARATUS

(71) Applicant: SEIKO EPSON CORPORATION, Tokyo (JP)

(72) Inventors: Hiroyuki Kosuge, Matsumoto (JP); Koki Ishikawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 165 days.

(21) Appl. No.: 18/325,048

(22) Filed: May 29, 2023

(65) Prior Publication Data

US 2023/0382136 A1 Nov. 30, 2023

(30) Foreign Application Priority Data

May 30, 2022 (JP) ................................ 2022-087481

(51) Int. Cl.
*B41J 11/00* (2006.01)
*B65H 5/02* (2006.01)

(52) U.S. Cl.
CPC ............ *B41J 11/007* (2013.01); *B65H 5/021* (2013.01); *B65H 2404/255* (2013.01)

(58) Field of Classification Search
CPC ........ B41J 11/007; B41J 13/025; B41J 13/08; B41J 15/04; B41J 11/04; B41J 29/38; B41J 13/076; B41J 15/048; B65H 2801/06; B65H 5/06; B65H 5/021; B65H 2601/324; B65H 2404/20; B65H 2404/255; B65H 2404/25; B65H 2404/2693; B65H 2404/26; B65H 2601/11
See application file for complete search history.

(56) References Cited

U.S. PATENT DOCUMENTS

| | | | | |
|---|---|---|---|---|
| 2014/0174891 | A1* | 6/2014 | Mayer ...................... | B26D 7/32 198/804 |
| 2016/0279970 | A1* | 9/2016 | Nakata .................. | B41J 13/025 |
| 2018/0236785 | A1 | 8/2018 | Sadakuni et al. | |

FOREIGN PATENT DOCUMENTS

| | | |
|---|---|---|
| JP | 2018130919 A | 8/2018 |

* cited by examiner

*Primary Examiner* — Jannelle M Lebron
(74) *Attorney, Agent, or Firm* — CHIP LAW GROUP

(57) ABSTRACT

A medium transport device includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit; and a motor that is a power source for rotating the belt unit with respect to the first support section and the second support section, wherein: a handwheel is configured to be attached to and detached from an output shaft of the motor or a rotation shaft on a power transmission mechanism that transmits power from the motor to the belt unit.

6 Claims, 9 Drawing Sheets

MEDIUM TRANSPORT DEVICE AND RECORDING APPARATUS

The present application is based on, and claims priority from JP Application Serial Number 2022-087481, filed May 30, 2022, the disclosure of which is hereby incorporated by reference herein in its entirety.

BACKGROUND

1. Technical Field

The present disclosure relates to a medium transport device that transports a medium, and a recording apparatus including the medium transport device.

2. Related Art

In a recording apparatus, represented by a printer, a configuration that uses a transport belt to transport a medium, represented by recording sheet, may be employed. In the recording apparatus according to JP-A-2018-130919, a belt transport section, which is a unit including a transport belt, can switch between a first state when recording and a second state, which is separated from the recording head, by rotating. The belt transport section is rotatable with respect to the frame and is rotated by a linkage mechanism operated by a motor.

The transport belt has a shorter life span than that of other components and is in high need of replacement. However, JP-A-2018-130919 did not give special consideration to such a requirement. Therefore, it was desired to improve workability when replacing the transport belt.

SUMMARY

In order to solve the above problem, a medium transport device of the present disclosure includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit; and a motor that is a power source for rotation of the belt unit supported by the first support section and the second support section, wherein: a handwheel is configured to be attached to and detached from an output shaft of the motor or a rotation shaft on a power transmission mechanism that transmits power from the motor to the belt unit.

Further, the medium transport device of the present disclosure includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced and a guide member configured to guide the second roller so that the distance between shafts becomes shorter when the belt unit rotates from the first posture to the second posture, is configured to be attached to and detached from at least one of the first support section or the second support section.

Further, the medium transport device of the present disclosure includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit; a first linkage mechanism provided with respect to the belt unit on the first support section side in the width direction; a second linkage mechanism provided with respect to the belt unit on the second support section side in the width direction; a transmission shaft configured to transmit power to the first linkage mechanism and to the second linkage mechanism, and a configuration that converts rotation of the transmission shaft into rotation of the belt unit via the first linkage mechanism and the second linkage mechanism, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced, the transmission shaft is movable in a direction that intersects the shaft direction, and when the transmission shaft is in a second position, the distance between shafts when the belt unit rotates from the first posture to the second posture becomes shorter than when the transmission shaft is in a first position.

Further, a recording apparatus of this disclosure includes a recording section for recording on a medium and any of the above medium transport devices.

DESCRIPTION OF EMBODIMENTS

Figure 1:
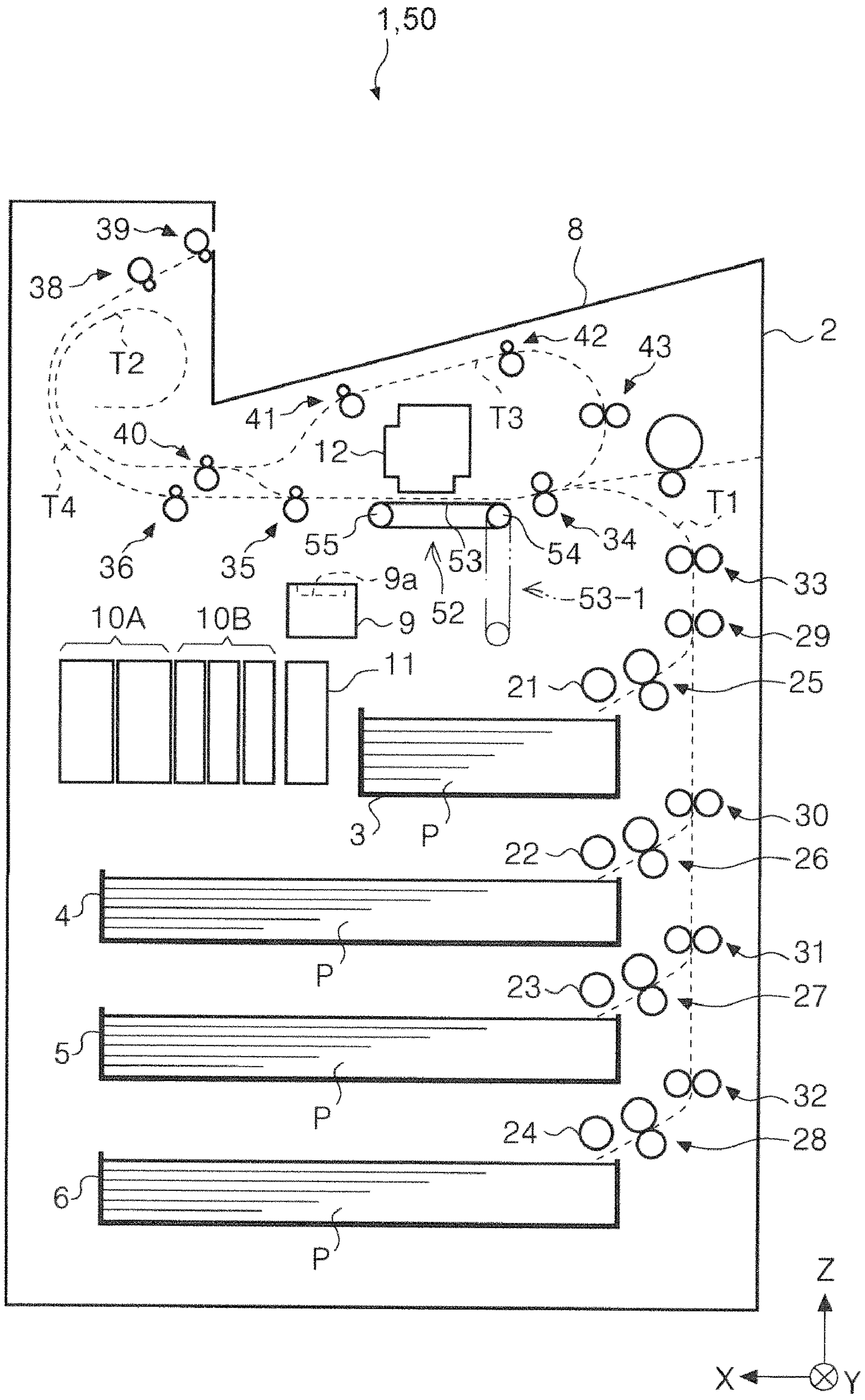
FIG. 1 is a diagram showing the entirety of a medium transport path in a printer.

The following is a description of the disclosure in general terms.

A medium transport device according to a first aspect includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit; and a motor that is a power source for rotation of the belt unit supported by the first support section and the second support section, wherein: a handwheel is configured to be attached to and detached from an output shaft of the motor or a rotation shaft on a power transmission mechanism that transmits power from the motor to the belt unit.

According to this aspect, the handwheel is configured to be attached to and detached from the output shaft of the motor or the rotation shaft in the power transmission mechanism that transmits power from the motor to the belt unit. Therefore, even if the power supply to the motor and control of the motor are not available, the belt unit can be manually rotated in a good workable manner and workability when replacing the transport belt is improved.

A medium transport device according to a second aspect is an aspect according to the first aspect, wherein the medium transport device further includes an encoder scale provided on an output shaft of the motor and a cover that covers the encoder scale, wherein: an opening is formed in the cover that exposes an end portion of the output shaft of the motor and the handwheel is configured to be attached to and detached from the output shaft of the motor exposed through the opening.

According to this aspect, the encoder scale provided on the output shaft of the motor is covered by the cover, so that the encoder scale can be protected by the cover. Further, the opening is formed in the cover so as to expose the end portion of the output shaft of the motor, and the handwheel is configured to be attached to and detached from the output shaft of the motor exposed from the opening. Thus, the workability is improved by eliminating the need to remove the cover when attaching the handwheel.

A medium transport device according to a third aspect is an aspect according to the first aspect, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced and a guide member configured to guide the second roller so that the distance between shafts becomes shorter when the belt unit rotates from the first posture to the second posture, is configured to be attached to and detached from at least one of the first support section or the second support section.

According to this aspect, when the belt unit rotates from the first posture to the second posture, the guide member, which guides the second roller so that the distance between shafts becomes shortened, can be attached to and detached from the support. Therefore, the tension of the transport belt is weakened in the second posture, which is the posture when the transport belt is replaced. This makes it easier to weaken the tension of the transport belt when replacing the transport belt, and improves workability when replacing the transport belt. In this specification, "weaken the tension of the transport belt" includes when the tension is reduced to zero. This aspect is not limited to the first aspect, and may be applied to the second aspect.

A medium transport device according to a fourth aspect is an aspect according to the first aspect, wherein the medium transport device further includes a first linkage mechanism provided with respect to the belt unit on the first support section side in the width direction; a second linkage mechanism provided with respect to the belt unit on the second support section side in the width direction; a transmission shaft that is a shaft for transmitting power to the first linkage mechanism and the second linkage mechanism and that is driven by the motor, and a configuration that converts rotation of the transmission shaft into rotation of the belt unit via the first linkage mechanism and the second linkage mechanism, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced, the transmission shaft is movable in a direction that intersects the shaft direction, and when the transmission shaft is in a second position, the distance between shafts when the belt unit rotates from the first posture to the second posture becomes shorter than when the transmission shaft is in a first position.

According to this aspect, the transmission shaft is movable in a direction intersecting the shaft direction, and when the transmission shaft is in the second position, the distance between shafts when the belt unit rotates from the first posture to the second posture becomes shorter than when the transmission shaft is in the first position. Therefore, the tension of the transport belt is weakened in the second posture, which is the posture when the transport belt is replaced. This makes it easier to weaken the tension of the transport belt when replacing the transport belt, and improves workability when replacing the transport belt. This aspect is not limited to the first aspect, and may be applied to the second aspect.

A medium transport device according to a fifth aspect is an aspect according to the third aspect, wherein the medium transport device further includes a holding unit for maintaining the distance between shafts when the belt unit takes the second posture.

According to this aspect, since the belt unit has the holding unit that maintains the distance between shafts when the belt unit takes the second posture, it is possible to suppress an unintended increase of the tension of the transport belt when replacing the transport belt and good workability can be maintained when replacing the transport belt. This aspect is not limited to the above third aspect, but may be applied to the fourth aspect, or to the sixth or seventh aspects, which will be described later.

A medium transport device according to a sixth aspect includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced and a guide member configured to guide the second roller so that the distance between shafts becomes shorter when the belt unit rotates from the first posture to the second posture, is configured to be attached to and detached from at least one of the first support section or the second support section.

According to this aspect, when the belt unit rotates from the first posture to the second posture, the guide member, which guides the second roller so that the distance between shafts becomes shortened, can be attached to and detached from the support. Therefore, the tension of the transport belt is weakened in the second posture, which is the posture when the transport belt is replaced. This makes it easier to weaken the tension of the transport belt when replacing the transport belt, and improves workability when replacing the transport belt.

A medium transport device according to a seventh aspect includes a belt unit that is a unit having a transport belt configured to attract and transport a medium and that is rotatably supported on both sides in a width direction, which intersects a medium transport direction; a first support section that is disposed on one side of the belt unit in the width direction and that rotatably supports the belt unit; a second support section that is disposed on the other side of the belt unit in the width direction and that rotatably supports the belt unit; a first linkage mechanism provided with respect to the belt unit on the first support section side in the width direction; a second linkage mechanism provided with respect to the belt unit on the second support section side in the width direction; a transmission shaft configured to transmit power to the first linkage mechanism and to the second linkage mechanism, and a configuration that converts rotation of the transmission shaft into rotation of the belt unit via the first linkage mechanism and the second linkage mechanism, wherein: the belt unit further has a first roller around which the transport belt is wound, a second roller around which the transport belt is wound and that is displaceable in a direction of advancing and retreating with respect to the first roller, and a pressing member that presses the second roller in a direction that increases distance between shafts of the second roller and the first roller, wherein: the belt unit has a first posture and a second posture, the second posture being different from the first posture and being used when the transport belt is replaced, the transmission shaft is movable in a direction that intersects the shaft direction, and when the transmission shaft is in a second position, the distance between shafts when the belt unit rotates from the first posture to the second posture becomes shorter than when the transmission shaft is in a first position.

According to this aspect, the transmission shaft is movable in a direction intersecting the shaft direction, and when the transmission shaft is in the second position, the distance between shafts when the belt unit rotates from the first posture to the second posture becomes shorter than when the transmission shaft is in the first position. Therefore, the tension of the transport belt is weakened in the second posture, which is the posture when the transport belt is replaced. This makes it easier to weaken the tension of the transport belt when replacing the transport belt, and improves workability when replacing the transport belt.

A recording apparatus according to an eighth aspect includes a recording section for recording on a medium and the medium transport device according to any one of the first to seventh aspects.

According to this aspect, in the recording apparatus, any of the effects of the first through seventh aspects described above can be obtained.

Hereinafter, the present disclosure will be specifically described.

Hereinafter, an inkjet printer 1 that performs recording by ejecting ink, which is an example of a liquid, onto recording sheet, which is an example of a medium, is described as an example of a recording apparatus. The inkjet printer 1 is hereinafter abbreviated as a printer 1.

The inkjet printer 1 can also be regarded as a medium transport device 50 from the viewpoint of transporting a medium. In the viewpoint of the medium transport device 50, it may or may not have a line head 12, which is described later.

An X-Y-Z coordinate system shown in each figure is an orthogonal coordinate system, where a Y-axis direction is a width direction that intersects a medium transport direction and is a depth direction of the device. In this embodiment, of the side surfaces constituting the periphery of an apparatus main body 2, a side surface in the +Y direction is a back surface, and a side surface in the −Y direction is a front surface.

An X-axis direction is an apparatus width direction, and a +X direction is to the left side and a −X direction is to the right side as viewed from an operator of the printer 1. The −X direction is a direction in which a sheet is fed from each sheet cassette as will be described later. The Z-axis direction is the vertical direction, that is, a height direction of the apparatus, and a +Z direction is an upward direction and a −Z direction is a downward direction. In the following description, the direction in which the recording sheet is fed may be referred to as "downstream" and the opposite direction as "upstream". In FIG. 1, a sheet transport path is indicated by broken line. In the printer 1, a sheet is transported through the sheet transport path indicated by broken line.

The printer 1 is provided with a line head 12, to be described later, and has a plurality of sheet cassettes along the vertical direction at the bottom portion of the apparatus main body, specifically, a first sheet cassette 3, a second sheet cassette 4, a third sheet cassette 5, and a fourth sheet cassette 6. The character P indicates recording sheets accommodated in the sheet cassettes. For each sheet cassette, a pickup roller is provided to feed the accommodated recording sheets in the −X direction. Characters 21, 22, 23 and 24 indicate pickup rollers provided to the sheet cassettes. Further, for each sheet cassette, there is a feed roller pair that feeds the recording sheet, fed by the pickup roller, further downstream. Characters 25, 26, 27 and 28 indicate feed roller pairs provided to each sheet cassette. In the following description, unless otherwise specified, a "roller pair" is configured by a drive roller driven by a motor (not shown) and a driven roller in contact with and driven by the drive roller.

A character T1 indicates a transport path of the recording sheet that is fed out from the sheet cassettes and reaches a transport roller pair 34. The recording sheet fed out from the first sheet cassette 3 is fed to the transport roller pair 34, receiving a feed force from transport roller pairs 29 and 33. The recording sheet fed out from the second sheet cassette 4 is fed to the transport roller pair 34, receiving a feed force from the transport roller pairs 30, 29, and 33. The recording sheet fed out from the third sheet cassette 5 is fed to the transport roller pair 34, receiving a feed force from the transport roller pairs 31, 30, 29, and 33. The recording sheet fed out from the fourth sheet cassette 6 is fed to the transport roller pair 34, receiving a feed force from the transport roller pairs 32, 31, 30, 29, and 33.

The recording sheet receiving the feed force from the transport roller pair 34 is sent to a recording position between the line head 12, which is an example of a recording section and a liquid ejection head, and the transport belt 53, that is, the recording position facing the line head 12. The line head 12 ejects ink, which is an example of liquid, onto a surface of the recording sheet to perform recording. The line head 12 is an ink ejection head configured so that nozzles ejecting ink cover an entire area in the sheet width direction, and is configured as an ink ejection head capable of recording over the entire area in the sheet width direction without moving in the sheet width direction. However, the ink ejection head is not limited to this type, but may be mounted on a carriage and eject ink while moving in the sheet width direction.

Figure 2:
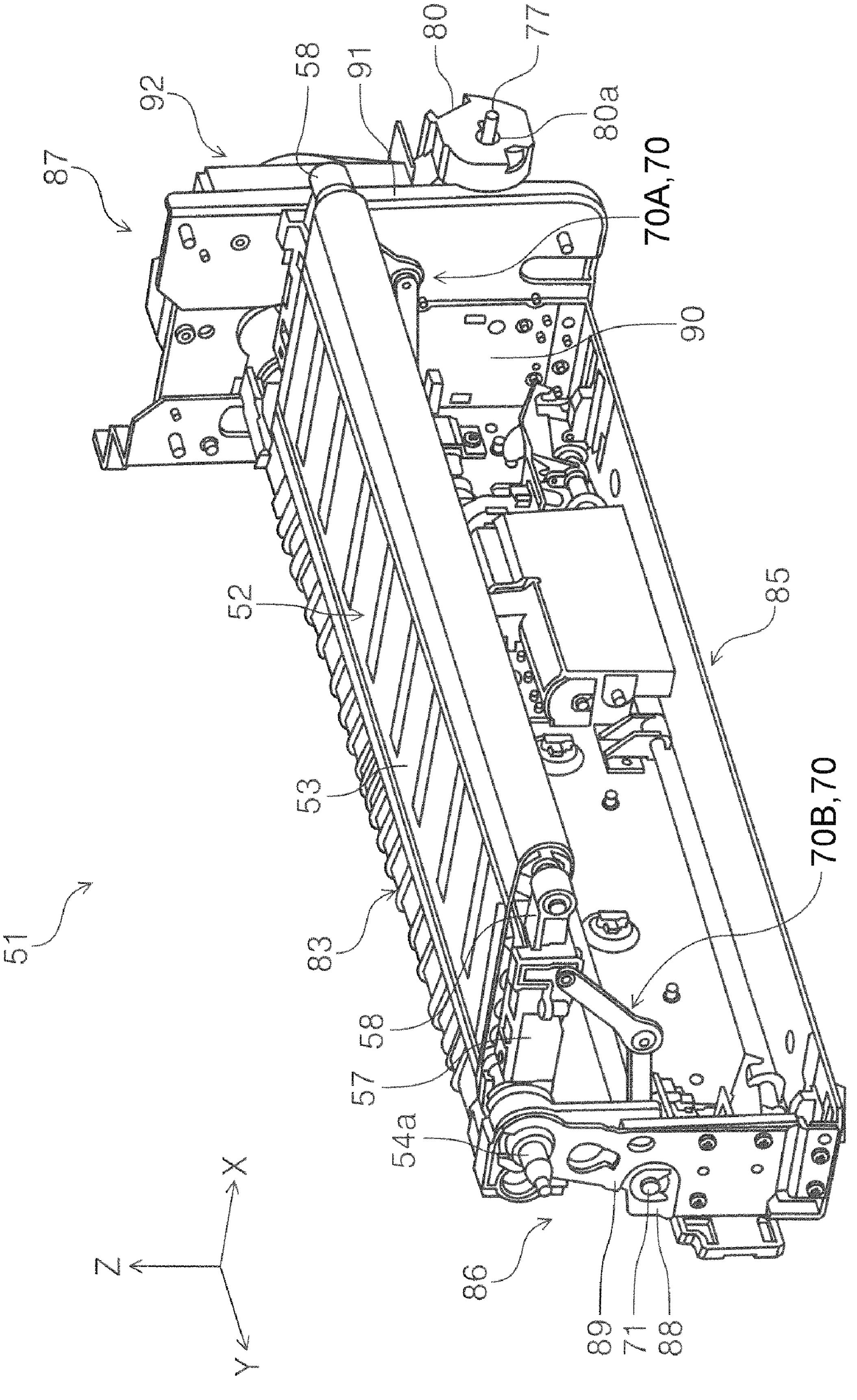
FIG. 2 is a perspective view of the transport unit in a state where a belt unit is in a second posture.
Figure 3:
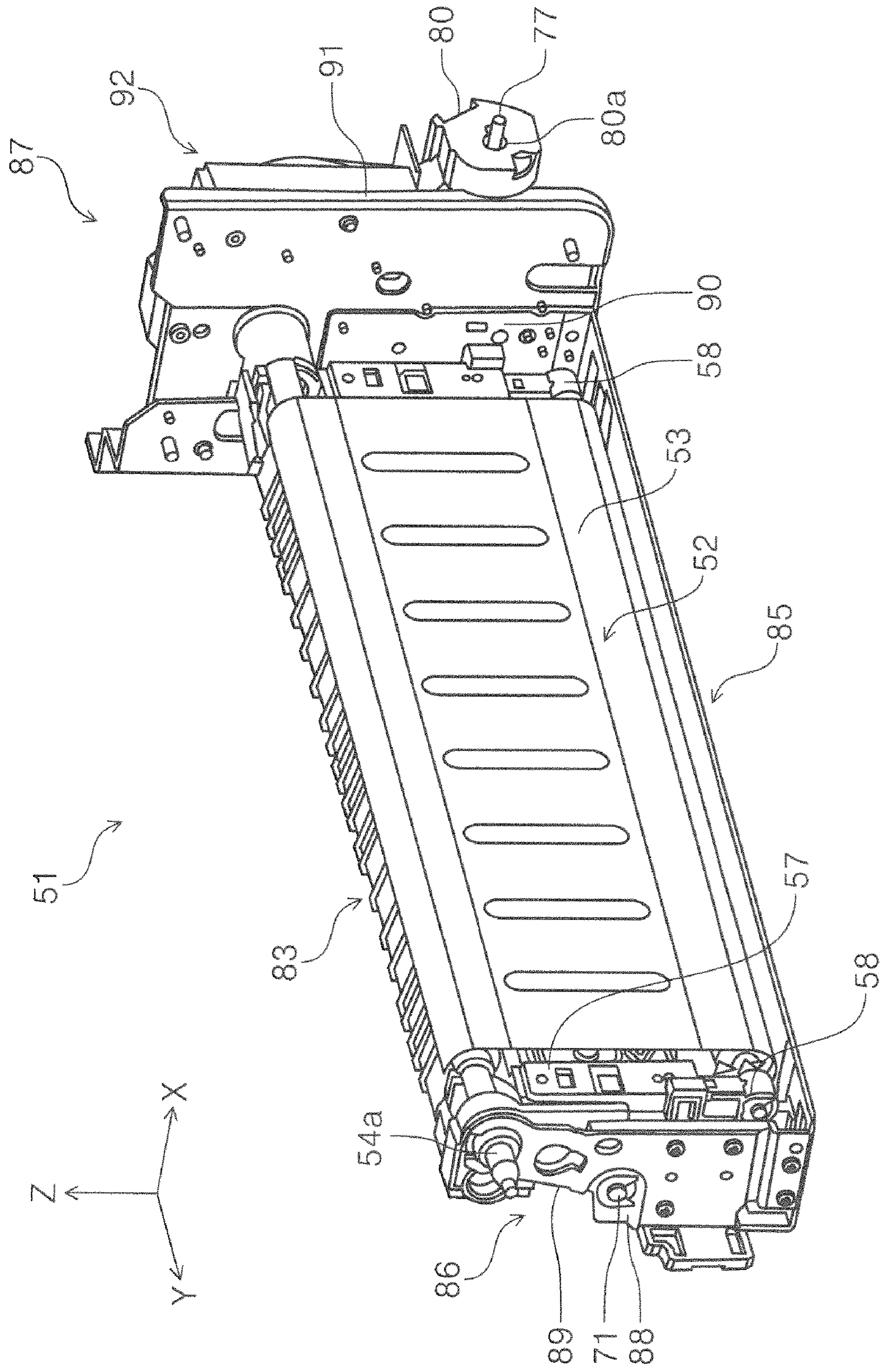
FIG. 3 is a perspective view of the transport unit in a state where the belt unit is in a first posture.

The transport belt 53 is an endless belt that is wound around a first roller 54 and a second roller 55, and rotates when the first roller 54 is driven by a drive unit 92 (see FIGS. 2 and 3). The recording sheet is transported to a position facing the line head 12 while being attracted onto the belt surface of the transport belt 53. An electrostatic attraction method is used in this embodiment for attracting the recording sheet to the transport belt 53. A unit for electrifying the transport belt 53 will be described later.

The recording sheet that has been recorded on the first surface by the line head 12 is sent by a transport roller pair 35, located downstream of the transport belt 53, toward either a transport roller pair 36 or a transport roller pair 40. A path switching flap (not shown) is provided downstream of the transport roller pair 35. With this path switching flap, the recording sheet that receives a feed force from the transport roller pair 35 is sent to either the transport roller pair 36 or the transport roller pair 40.

When recording is not performed on both a first surface and an opposite second surface of the recording sheet, that is, when double-sided recording is not performed, the recording sheet is sent from the transport roller pair 35 to the transport roller pair 36, and is discharged through a discharge path T4 toward a discharge tray 8. A transport roller pair 38 and a transport roller pair 39 are provided in the discharge path T4.

When recording is performed on both the first surface and the opposite second surface of the recording sheet, that is, when double-sided recording is performed, the recording sheet is sent from the transport roller pair 35 to a transport roller pair 40, and enters a switchback path T2. A rotation direction of the transport roller pair 40 is then switched, and the recording sheet enters an inversion path T3 and is sent to the transport roller pair 34 by transport roller pairs 41, 42, and 43.

Characters 10A and 10B are ink containers as liquid containers, which contain ink before ejection. The ink to be ejected from the line head 12 is supplied from the ink containers 10A and 10B to the line head 12 through tubes (not shown). A character 9 indicates a cap unit having a cap section 9*a* that caps the line head 12. The cap unit 9 is provided so that it can be displaced between a cap position (not shown), in which the cap section 9*a* caps the line head 12, and a separation position (shown in FIG. 1), in which the cap section 9*a* is separated from the line head 12. As will be described in detail later, when the cap unit 9 moves to the cap position, the transport belt 53 moves away from a position facing the line head 12, as shown by two dot chain line and character 53-1.

A character 11 indicates a waste liquid container that stores ink as waste liquid ejected for maintenance from the line head 12 to the cap section 9*a*. Ink as waste liquid, ejected for maintenance from the line head 12 to the cap section 9*a*, is sent from the cap section 9*a* to the waste liquid container 11 through tubes (not shown).

Next, the transport unit 51, including the transport belt 53, will be described with reference to FIG. 2 and on. The transport unit 51 has a belt unit 52 including the transport belt 53 that attracts and transports the recording sheet. The belt unit 52 is a unit that is rotatably supported on both sides in the Y-axis direction, that is, in the width direction. The transport unit 51 has a first support section 86 that is located in the +Y direction, which is one side of the belt unit 52 in the Y-axis direction, and that rotatably supports the belt unit 52. The transport unit 51 also has a second support section 87 that is located in the −Y direction, which is the other side of the belt unit 52 in the Y-axis direction, and that rotatably supports the belt unit 52. The belt unit 52 is rotatable with a rotation shaft 54*a* of the first roller 54 being supported by the first support section 86 and the second support section 87.

The first support section 86 includes a first frame 88 and a second frame 89. The second support section 87 includes a third frame 90, a fourth frame 91, and a drive unit 92.

A base body of the transport unit 51 is configured by a frame unit 85. The frame unit 85 includes the first frame 88 and the second frame 89 at an end portion in the +Y direction, and includes a third frame 90 at an end portion in the −Y direction. A fourth frame 91 is attached to the third frame 90, and the drive unit 92 is attached to the fourth frame 91, and by this the second support section 87 is configured. The drive unit 92 is a unit that includes a motor (not shown), which transmits power to the rotation shaft 54*a* of the first roller 54 and rotates the transport belt 53. An end portion of the rotation shaft 54*a* in the −Y direction is supported by the drive unit 92. An end portion of the rotation shaft 54*a* in the +Y direction is supported by the second frame 89.

Figure 5:
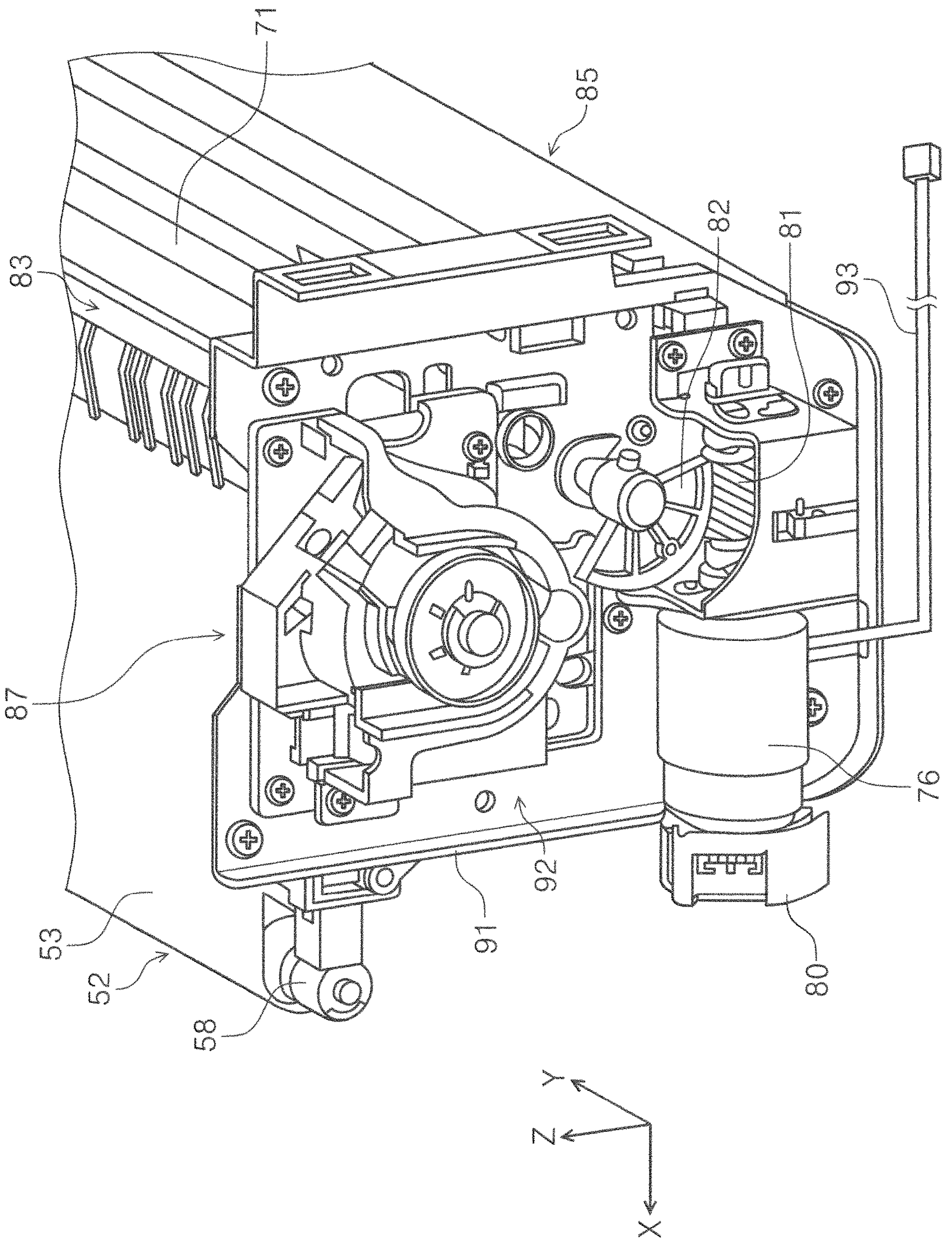
FIG. 5 is a perspective view of a second support section.

As shown in FIG. 5, a raising/lowering motor 76 for rotating a transmission shaft 71 is attached to the fourth frame 91. The raising/lowering motor 76 has an output shaft 77 (see FIGS. 2 and 3) protruding in the +X direction, and a worm gear 81 is attached to the output shaft protruding in the −X direction (not shown). On the other hand, a gear 82 is attached to an end portion of the transmission shaft 71 in the −Y direction. The worm gear 81 meshes with the gear 82, and the power of the raising/lowering motor 76 is transmitted from the worm gear 81 to the gear 82, and the transmission shaft 71 rotates. A function of the transmission shaft 71 will be described again later.

Figure 4A:
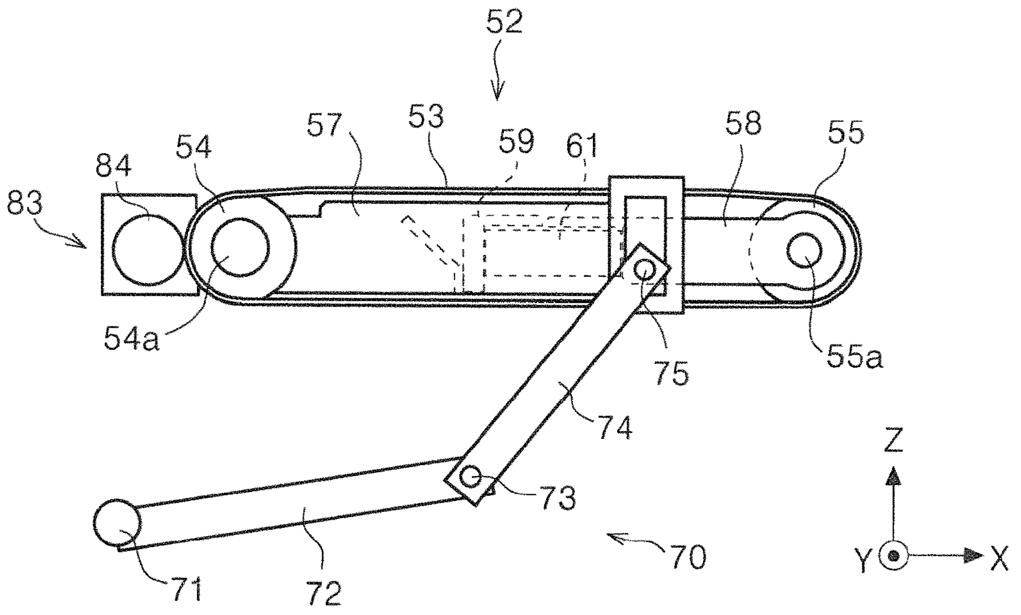
FIG. 4A is a side view of the transport unit in a state in which the belt unit is in the second posture.
Figure 4B:
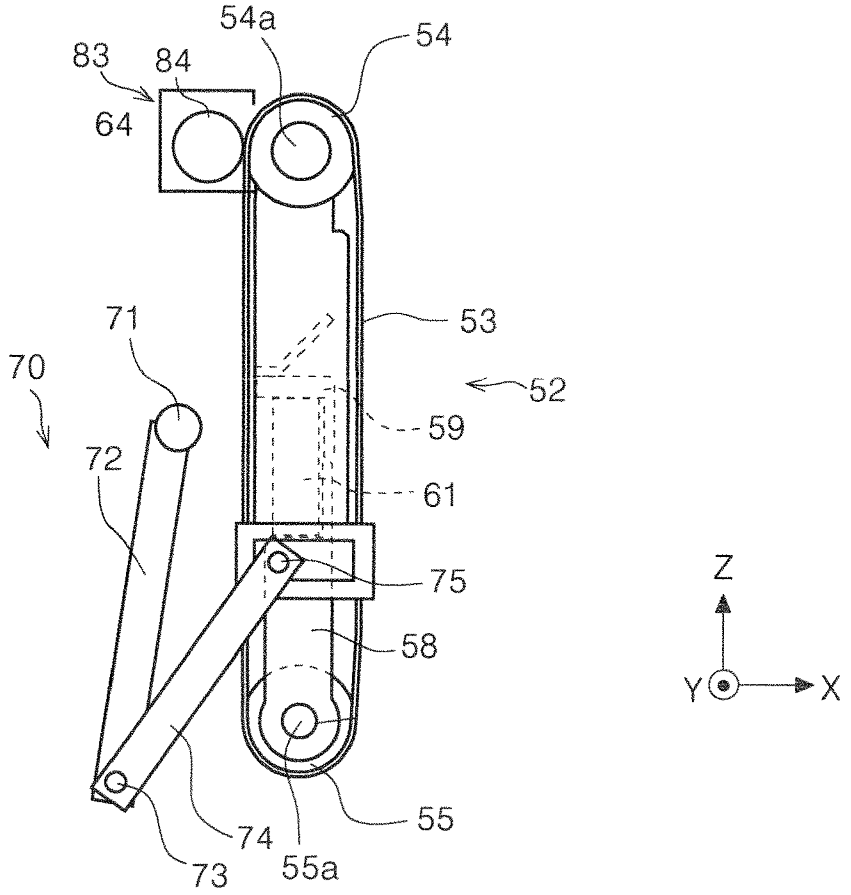
FIG. 4B is a side view of the transport unit in a state where the belt unit is in the first posture.

A configuration of the belt unit 52 will be described next. As shown in FIGS. 4A and 4B, the belt unit 52 has the first roller 54 and the second roller 55 around which the transport belt 53 is wound, a first member 57 that engages the first roller 54, and a second member 58 that engages the second roller 55 and that is displaceable with respect to the first member 57 in a direction that changes the distance between shafts of the first roller 54 and the second roller 55. The belt unit 52 also has a coil spring 61, which is a pressing member that presses the second member 58 in the direction that increases the distance between shafts, and a third member 59, which is a member that receives the pressing force of the coil spring 61 and that is displaceable in the displacement direction of the second member 58.

The first member 57 is a member that configures a base body of the belt unit 52, that maintains an overall shape of the transport belt 53 wound around the first roller 54 and the second roller 55, and that is rotatable about the rotation shaft 54*a* of the first roller 54. The second member 58 supports the rotation shaft 55*a* of the second roller 55 and is slidable with respect to the first member 57, the sliding directions of which are in the directions in which the second roller 55 advances and retracts with respect to the first roller 54. That is, a direction in which the second member 58 separates from the first member 57 is a direction in which the distance between shafts of the first roller 54 and the second roller 55 increases and a direction in which the tension of the transport belt 53 increases. Further, a direction in which the second member 58 moves closer to the first member 57 is a direction in which the distance between shafts of the first roller 54 and the second roller 55 becomes shorter, and a direction in which the tension of the transport belt 53 is weakened.

The third member 59 is a spring receiving member, and the further the third member 59 is separated from the first roller 54, the shorter the spring length of the coil spring 61 becomes and the more the tension of the transport belt 53 increases.

The belt unit 52 has a charging unit 83. The charging unit 83 includes a charging roller 84. The charging roller 84 is a roller that contacts an outer surface of the transport belt 53 and rotates driven by the rotation of the transport belt 53. A DC voltage is applied to the charging roller 84 by a power supply device (not shown), which supplies an electric charge to the area where the charging roller 84 is in contact with the transport belt 53. As a result, the outer surface of the transport belt 53 is charged with positive polarity, and the outer surface of the transport belt 53 becomes an attraction surface that attracts the recording sheet.

The belt unit 52 with the above configuration is rotatably supported by the first support section 86 and the second support section 87 as described above. The belt unit 52 is then rotated by the linkage mechanism 70 to switch between a second posture shown in FIG. 4A and a first posture shown in FIG. 4B. The second posture of the belt unit 52 is a posture for transporting the recording sheet and for replacing the transport belt 53. The first posture of the belt unit 52 is a posture when the cap section 9*a* of the cap unit 9 caps the line head 12, like the transport belt shown by a character 53-1 in FIG. 1.

The linkage mechanism 70 has a first linkage mechanism 70A provided in the +Y direction in the width direction, or the Y-axis direction, and a second linkage mechanism 70B provided in the −Y direction, as shown in FIG. 2. The basic configuration of the first linkage mechanism 70A and the second linkage mechanism 70B are identical, with a first link rod 72 and a second link rod 74, as shown in FIGS. 4A and 4B, respectively.

The first link rod 72 is connected to the transmission shaft 71 and rotates with the rotation of the transmission shaft 71. The first link rod 72 and the second link rod 74 are rotatably connected to each other via a first connection shaft 73, and the second link rod 74 is connected to the first member 57 via a second connection shaft 75.

The transmission shaft 71 extends along the Y-axis direction, is rotatably supported by the frame unit 85, and rotates under the power of the raising/lowering motor 76 (see FIG. 5) described above. When the transmission shaft 71 rotates, the linkage mechanism 70 operates and the belt unit 52 rotates. That is, the rotation of the transmission shaft 71 causes the belt unit 52 to switch between the first posture and the second posture. As described above, the printer 1 has a configuration in which the rotation of the transmission shafts 71 is converted to the rotation of the belt unit 52 via the first linkage mechanism 70A and the second linkage mechanism 70B.

In the transport unit 51 with the above configuration, the transport belt 53 has a shorter life than other components and needs to be replaced more frequently. When replacing the transport belt 53, the transport unit 51 is removed from the printer 1. At this time, the belt unit 52 is in the first posture shown in FIGS. 3 and 4B. This is because the cap unit 9 is in the cap position when the printer 1 is in the print standby state or powered off.

Here, the transport belt 53 is removed by removing the second frame 89, which configures the first support section 86, and pulling out the transport belt 53 in the +Y direction. However, when the belt unit 52 is in the first posture shown in FIGS. 3 and 4B, the first frame 88 is in the way and the transport belt 53 cannot be pulled out in the +Y direction. Therefore, after the transport unit 51 is removed from the printer 1 to replace the transport belt 53, the belt unit 52 must be switched from the first posture to the second posture.

However, when the transport unit 51 is removed from the printer 1, a cable 93 (see FIG. 5) for supplying power to and controlling the raising/lowering motor 76 (see FIG. 5) must also be disconnected, thus the raising/lowering motor 76 cannot be operated by power. Therefore, when the transport unit 51 is removed from the printer 1, it is necessary to rotate the raising/lowering motor 76 must be turned manually by the operator.

Figure 6:
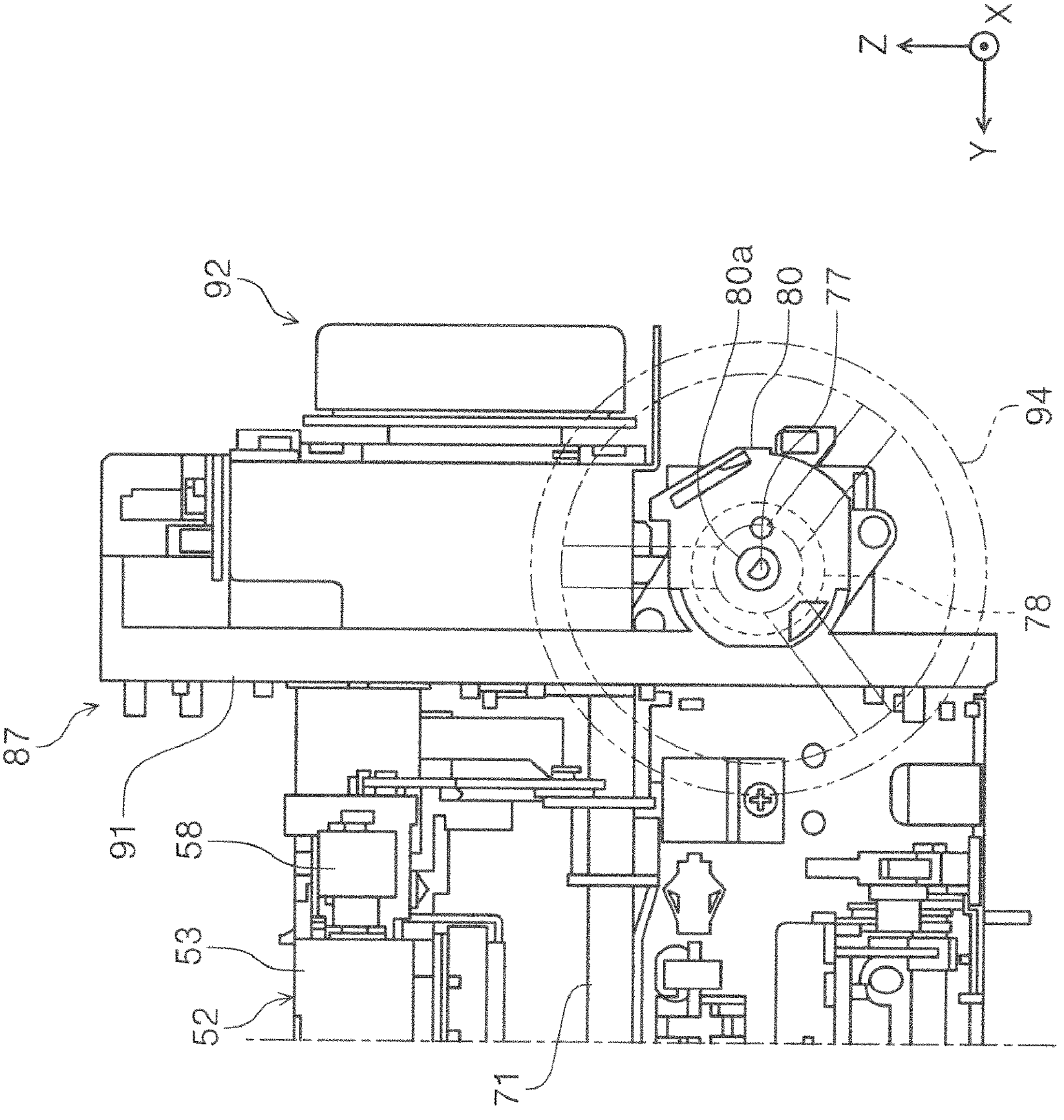
FIG. 6 is a front view of a part of the transport unit.

For this reason, the transport unit 51 of this embodiment is configured so that, as shown in FIG. 6, a handwheel 94 can be attached to an output shaft 77 protruding in the +X direction from the raising/lowering motor 76. More specifically, an encoder scale 78 is attached to an output shaft 77 protruding in the +X direction from the raising/lowering motor 76. The encoder scale 78, together with a detection section (not shown), configures a rotary encoder and contributes to detection of a rotation amount and a rotation direction of the raising/lowering motor 76. The encoder scale 78 is covered and protected by a cover 80.

An opening 80*a* is formed in the cover 80, and the output shaft 77 protrudes from the opening 80*a* (see also FIGS. 2 and 3). The output shaft 77 is formed in a D-cut shape and fits into a fitting portion (not shown) formed on the handwheel 94 to prevent idle rotation when the handwheel 94 is turned.

The output shaft 77 of the raising/lowering motor 76 can be rotated by attaching the handwheel 94 and rotating it. As a result, the belt unit 52 can be switched from the first posture to the second posture and from the second posture to the first posture.

As described above, the printer 1 is configured so that the handwheel 94 can be attached to and detached from the output shaft 77 of the raising/lowering motor 76. The belt unit 52 can be manually rotated with good workability even when the power supply to the raising/lowering motor 76 and the control of the raising/lowering motor 76 are not available, and workability when the transport belt 53 is replaced is improved. In this embodiment, the handwheel 94 is configured to be attached to and detached from the output shaft 77 of the raising/lowering motor 76. However, the handwheel 94 may be configured to be attachable to and detachable from any rotation shaft in a power transmission mechanism that transmits power from the raising/lowering motor 76 to the belt unit 52.

In addition, the printer 1 has the cover 80 that covers the encoder scale 78. The cover 80 has an opening 80*a* that exposes the end of the output shaft 77 of the raising/lowering motor 76, and the handwheel 94 can be attached to and detached from the output shaft 77 of the raising/lowering motor 76 exposed through the opening 80*a*. This eliminates a need to remove the cover 80 when attaching the handwheel 94, and workability is improved.

In this embodiment, a configuration in which the belt unit 52 is manually rotated is employed. However, it is also desirable to allow the raising/lowering motor 76 to be driven even when the transport unit 51 is removed, for example, by securing a length of the cable 93 or a length of a connection cable on the apparatus main body side that is connected to the cable 93. In this case, it is also desirable to configure the printer to be able to execute a mode of switching the posture of the belt unit 52 via an operation panel of the printer 1 (not shown).

Figure 7:
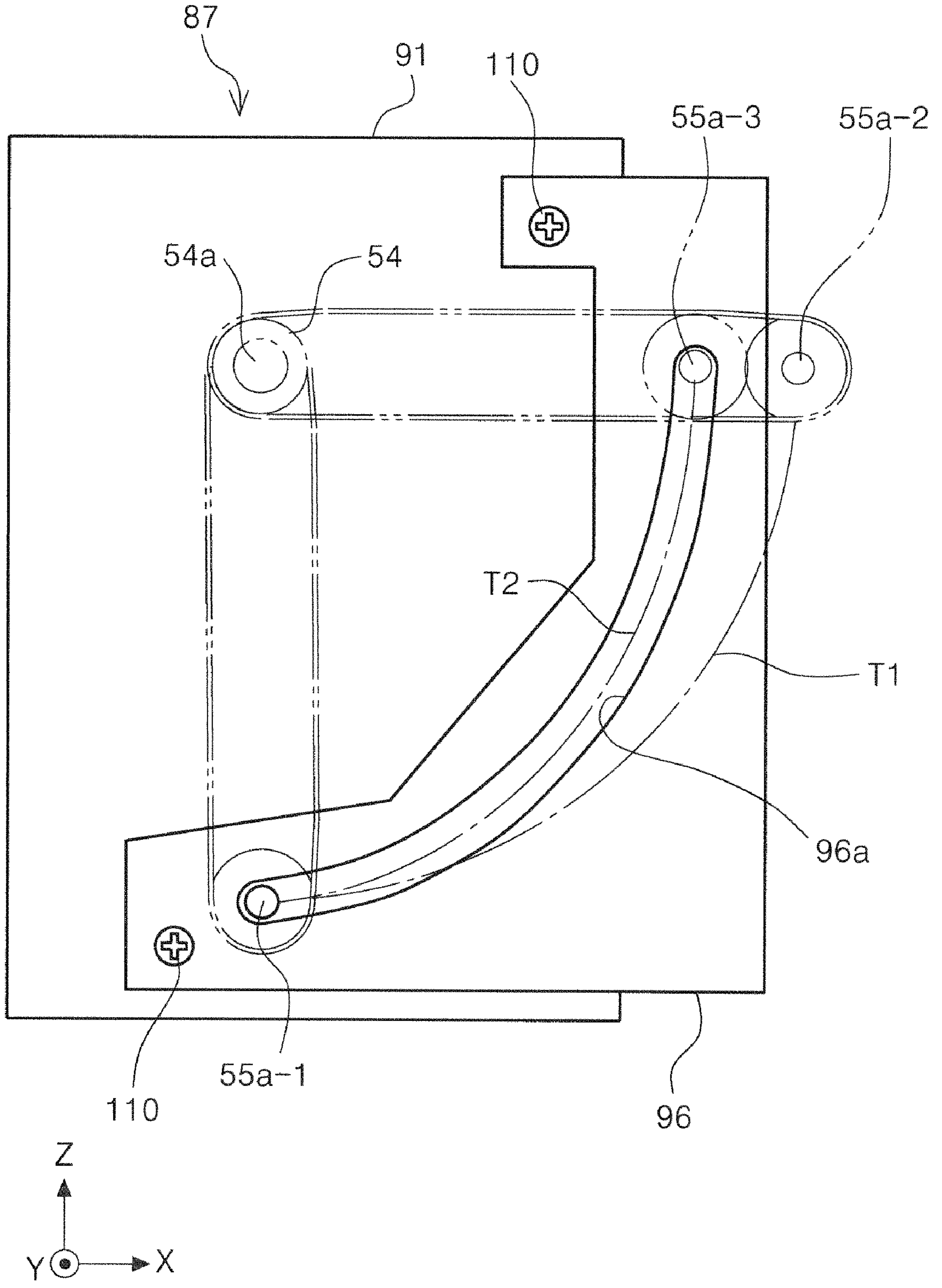
FIG. 7 is a front view of an inner surface of the second support section to which a guide member is attached.

Next, with reference to FIG. 7, the means of weakening the tension of the transport belt 53, when switching the belt unit 52 from the first posture to the second posture, will be described. In FIG. 7, character 96 indicates a guide member. Guide members 96 can be attached to and detached from the first support section 86 and the second support section 87. FIG. 7 shows the guide member 96 that can be detachable from an inner surface of the second support section 87 (a surface in the +Y direction). The guide member 96 may be attachable to and detachable from at least one of the first support section 86 and the second support section 87, but it is desirable for guide members 96 to be attachable to and detachable from both the first support section 86 and the second support section 87. In FIG. 7, character 110 is a screw that fixes the guide member 96 to the fourth frame 91 (see FIG. 3).

The guide member 96 has an arc-shaped groove 96*a* and is formed so that the rotation shaft 55*a* of the second roller 55 can enter the groove 96*a*. In FIG. 7, the curves indicated by characters T1 and T2 are the loci of the rotation shaft 55*a* when the belt unit 52 rotates from the first posture to the second posture. The curve T1 is the locus when the guide member 96 is used and the curve T2 is the locus when the guide member 96 is not used. Character 55*a*-1 indicates the rotation shaft 55*a* when the belt unit 52 is in the first posture and characters 55*a*-2, 55*a*-3 indicate the rotation shaft 55*a* when the belt unit 52 is in the second posture. The character 55*a*-2 indicates the rotation shaft 55*a* when the guide member 96 is not used, and the character 55*a*-3 indicates the rotation shaft 55*a* when the guide member 96 is used.

As indicated by the curve T2, the groove 96*a*, that is, the guide member 96, guides the second roller 55 so that the distance between shafts of the first roller 54 and the second roller 55 becomes shorter when the belt unit 52 rotates from the first posture to the second posture. According to this, the tension of the transport belt 53 is weakened in the second posture, which is the posture when the transport belt 53 is replaced. In other words, the tension of the transport belt 53 can be easily weakened when replacing the transport belt 53, and workability is improved when replacing the transport belt 53.

Figure 8A:
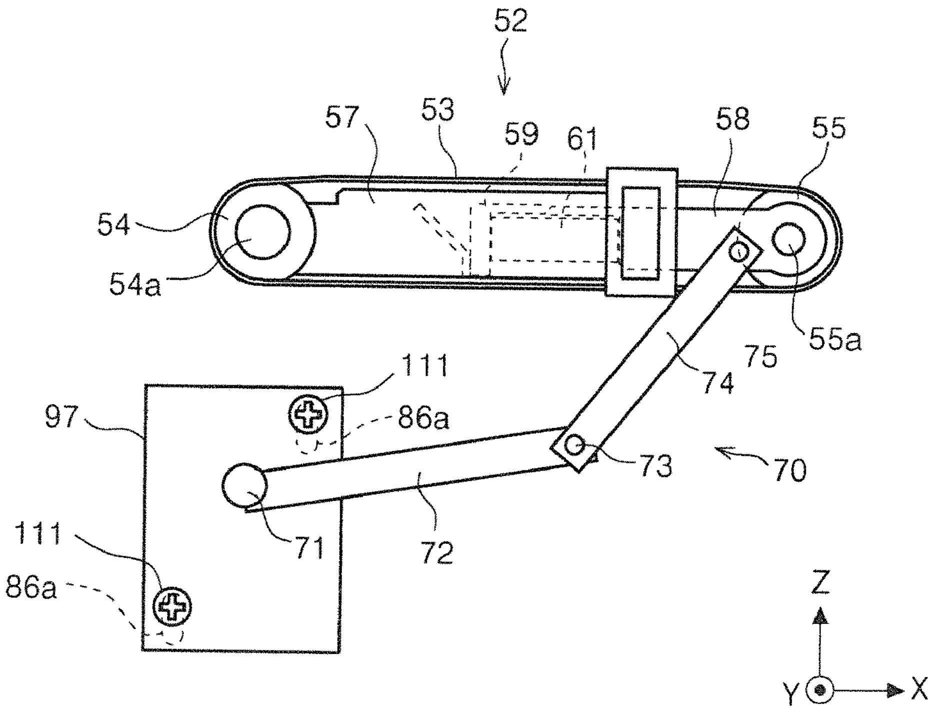
FIG. 8A is a front view of a configuration for displacing a transmission shaft and shows a state of the transmission shaft before displacement.
Figure 8B:
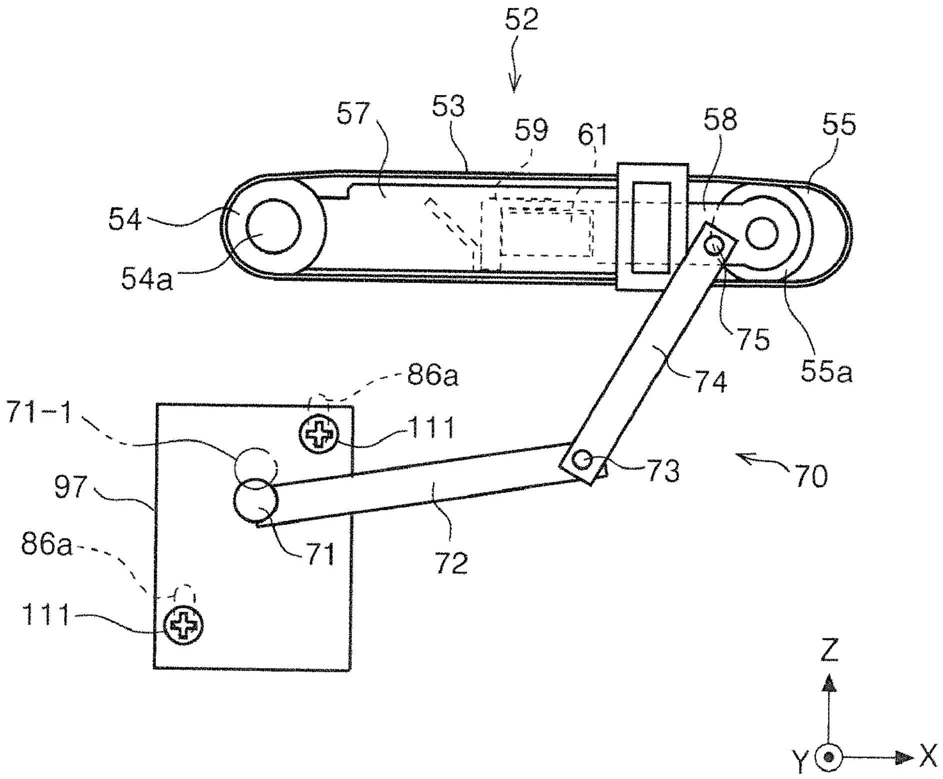
FIG. 8B is a front view of a configuration for displacing the transmission shaft and shows a state of the transmission shaft after displacement.

Next, referring to FIGS. 8A and 8B, other means of weakening the tension of the transport belt 53 when switching the belt unit 52 from the first posture to the second posture will be described. In FIGS. 8A and 8B, the transmission shaft 71 is supported by a support plate 97. A support plate 97 is provided on the first support section 86 and on the second support section 87, and FIGS. 8A and 8B show the support plate 97 provided on the first support section 86. The support plates 97 are fixed to the first frame 88 (see FIG. 3) and to the fourth frame 91 (see FIG. 3), for example, with screws 111.

Elongated holes 86*a* are formed in the first frame 88 (see FIG. 3) and in the fourth frame 91 (see FIG. 3), so that the fixing position of the support plate 97 with the screws 111 can be moved in the Z-axis direction. Accordingly, the transmission shaft 71 can be moved in the Z-axis direction, which is a direction that intersects the axial direction, that is, the Y-axis direction. The transmission shaft 71 is located further in the −Z direction when in the second position shown in FIG. 8B than when in the first position shown in FIG. 8A. When the transmission shaft 71 is in the first position shown in FIG. 8A, the rotation shaft 55*a* of the second roller 55 follows a locus similar to the curve T1 shown in FIG. 7 when the belt unit 52 is switched from the first posture to the second posture. When the transmission shaft 71 is in the second position shown in FIG. 8B, the rotation shaft 55*a* of the second roller 55 follows a locus similar to the curve T2 shown in FIG. 7 when the belt unit 52 is switched from the first posture to the second posture. That is, when the transmission shaft 71 is in the second position shown in FIG. 8B, the distance between shafts of the first roller 54 and the second roller 55 is shortened when the belt unit 52 rotates from the first posture to the second posture, and tension of the transport belt 53 is weakened. Thus, the tension of the transport belt 53 can be easily weakened when replacing the transport belt 53, and the workability when replacing the transport belt 53 is improved.

Figure 9A:
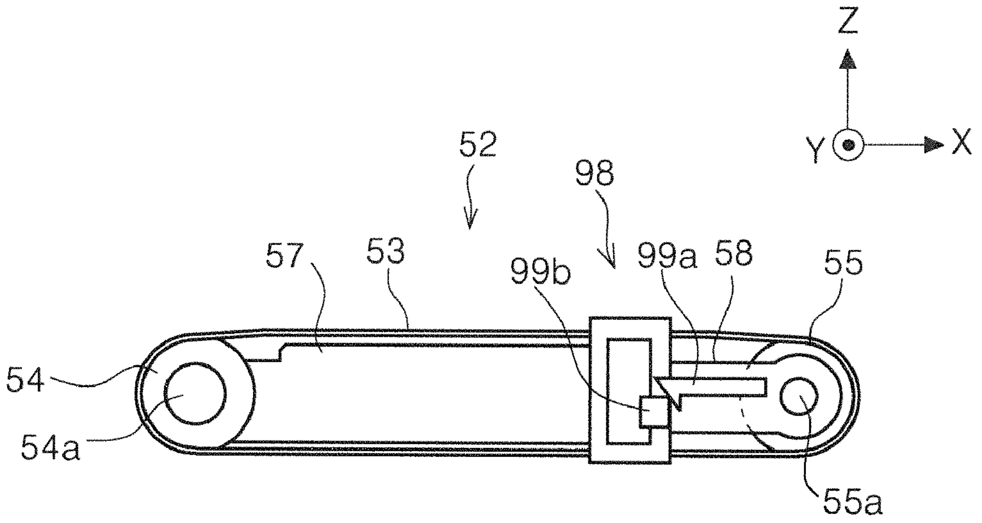
FIG. 9A is a view showing a holding unit maintaining the distance between shafts of first and second rollers.
Figure 9B:
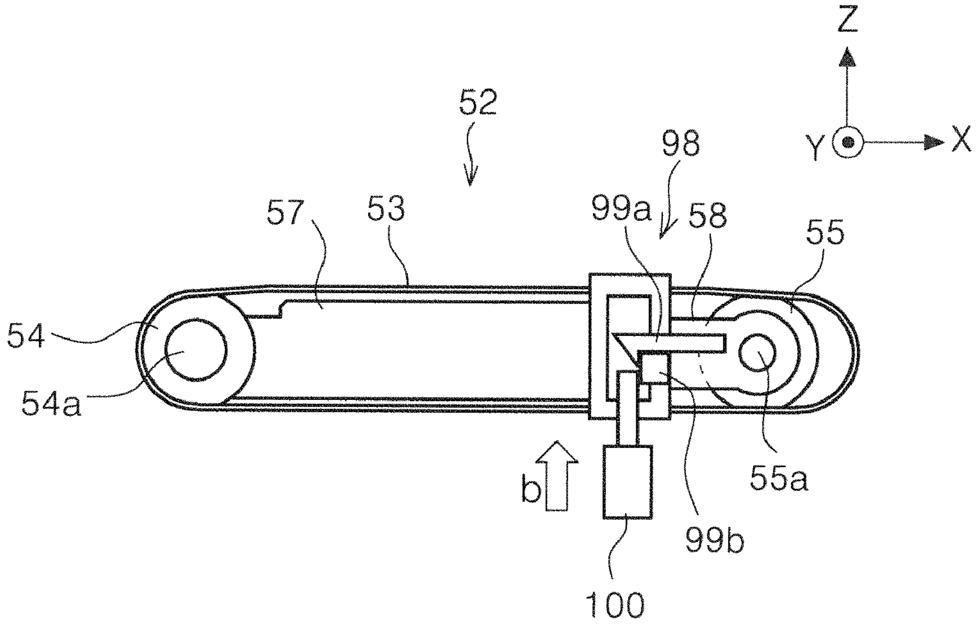
FIG. 9B is another view showing the holding unit maintaining the distance between shafts of the first and second rollers.

In the embodiment shown in FIG. 7 or FIGS. 8A and 8B, it is also desirable to provide a holding unit 98 as shown in FIGS. 9A and 9B to maintain the distance between shafts of the first roller 54 and the second roller 55 when the belt unit 52 takes the second posture. In this embodiment, the holding unit 98 has a hook 99*a* and an engaging portion 99*b*. The hook 99*a* is provided on the second member 58, and the engaging portion 99*b* is provided on the first member 57. The hook 99*a* is elastically deformable, and when the distance between shafts of the first roller 54 and the second roller 55 becomes shorter, as shown by the change from FIG. 9A to FIG. 9B, the hook 99*a* is hooked by the engaging portion 99*b* and the distance between shafts is maintained. In order to release the hook 99*a* from being hooked by the engaging portion 99*b*, as shown in FIG. 9B, the release member 100 is moved in the direction of arrow b to release the hook 99*a* from the engaging portion 99*b*. Such a holding unit 98 can suppress unintentional increases in the tension of the transport belt 53 when replacing the transport belt 53, thus it can maintain good workability when replacing the transport belt 53. The holding unit 98 is not limited to the configuration shown in FIGS. 9A and 9B, but can be of any configuration as long as it can maintain the distance between shafts.

Needless to say, the present disclosure is not limited to the embodiments described above, and various modifications are possible within the scope of the disclosure described in the claims, which are also included within the scope of the present disclosure.

What is claimed is:

1. A medium transport device comprising:

a belt unit having a transport belt configured to attract and transport a medium, wherein the belt unit is rotatably supported on both sides in a width direction, and the width direction intersects a medium transport direction;

a first support section that is disposed on a first side of the belt unit in the width direction and that rotatably supports the belt unit;

a second support section that is disposed on a second side of the belt unit in the width direction and that rotatably supports the belt unit;

a motor that is a power source for rotation of the belt unit supported by the first support section and the second support section, wherein a handwheel is configured to be attached to and detached from an output shaft of the motor or a rotation shaft on a power transmission mechanism that transmits power from the motor to the belt unit;

an encoder scale provided on the output shaft of the motor; and a cover that covers the encoder scale, wherein an opening is formed in the cover that exposes an end portion of the output shaft of the motor, and the handwheel is configured to be attached to and detached from the output shaft of the motor exposed through the opening.

2. The medium transport device according to claim 1, wherein the belt unit includes:

a first roller around which the transport belt is wound;

a second roller around which the transport belt is wound and that is displaceable in a direction of advancing and retreating with respect to the first roller; and a pressing member that presses the second roller in a direction that increases a distance between shafts of the second roller and the first roller, a posture of the belt unit includes a first posture and a second posture, the second posture being different from the first posture and being used when the transport belt is replaced, and a guide member configured to guide the second roller so that the distance between the shafts becomes shorter when the belt unit rotates from the first posture to the second posture, is configured to be attached to and detached from at least one of the first support section or the second support section.

3. The medium transport device according to claim 2, further comprising:

a holding unit for maintaining the distance between the shafts when the belt unit takes the second posture.

4. The medium transport device according to claim 1, further comprising:

a first linkage mechanism provided with respect to the belt unit on a first support section side in the width direction;

a second linkage mechanism provided with respect to the belt unit on a second support section side in the width direction;

a transmission shaft that is a shaft for transmitting power to the first linkage mechanism and the second linkage mechanism and that is driven by the motor, and a configuration that converts rotation of the transmission shaft into rotation of the belt unit via the first linkage mechanism and the second linkage mechanism, wherein:

the belt unit has a first roller around which the transport belt is wound;

a second roller around which the transport belt is wound and that is displaceable in a direction of advancing and retreating with respect to the first roller; and a pressing member that presses the second roller in a direction that increases distance between shafts of the second roller and the first roller, wherein:

a posture of the belt unit can be a first posture and a second posture, the second posture being different from the first posture and being used when the transport belt is replaced, the transmission shaft is movable in a direction that intersects a shaft direction, and when the transmission shaft is in a second position, the distance between shafts when the belt unit rotates from the first posture to the second posture becomes shorter than when the transmission shaft is in a first position.

5. A recording apparatus comprising:

a recording section for recording on a medium, and the medium transport device according to claim 1.

6. A medium transport device comprising:

a belt unit having a transport belt configured to attract and transport a medium, wherein the belt unit is rotatably supported on both sides in a width direction, the width direction intersects a medium transport direction, the belt unit includes:

a first roller around which the transport belt is wound;

a second roller around which the transport belt is wound and that is displaceable in a direction of advancing and retreating with respect to the first roller; and a pressing member that presses the second roller in a direction that increases a distance between shafts of the second roller and the first roller, a posture of the belt unit includes a first posture and a second posture, and the second posture is different from the first posture and is used in a case where the transport belt is replaced;

a first support section that is disposed on a first side of the belt unit in the width direction and that rotatably supports the belt unit;

a second support section that is disposed on a second side of the belt unit in the width direction and that rotatably supports the belt unit, wherein a guide member configured to guide the second roller so that the distance between the shafts becomes shorter in a case where the belt unit rotates from the first posture to the second posture, is configured to be attached to and detached from at least one of the first support section or the second support section; and a motor that is a power source for rotation of the belt unit supported by the first support section and the second support section, wherein a handwheel is configured to be attached to and detached from an output shaft of the motor or a rotation shaft on a power transmission mechanism that transmits power from the motor to the belt unit.

* * * * *